United States Patent
Ban et al.

(10) Patent No.: US 8,078,976 B2
(45) Date of Patent: Dec. 13, 2011

(54) METHOD AND APPARATUS FOR GENERATING ADAPTABLE PULL DOWN MENUS

(75) Inventors: Oliver Keren Ban, Austin, TX (US); Shu-Chen Lim, Singapore (SG); John S. Maresca, Hopewell Junction, NY (US); Jennifer Siu Chun Wong, Kowloon (HK)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 11/953,469

(22) Filed: Dec. 10, 2007

(65) Prior Publication Data

US 2009/0150830 A1   Jun. 11, 2009

(51) Int. Cl.
*G06F 3/00* (2006.01)
*G06F 3/048* (2006.01)

(52) U.S. Cl. .......... 715/747; 715/749; 715/843
(58) Field of Classification Search .......... 715/747, 715/749, 843
See application file for complete search history.

(56) References Cited

U.S. PATENT DOCUMENTS

| | | | |
|---|---|---|---|
| 5,581,682 A | 12/1996 | Anderson et al. | |
| 5,845,278 A | 12/1998 | Kirsch et al. | |
| 6,693,651 B2 | 2/2004 | Biebesheimer et al. | |
| 6,782,383 B2 * | 8/2004 | Subramaniam et al. | 707/706 |
| 6,958,758 B2 * | 10/2005 | Ulrich et al. | 345/619 |
| 7,243,308 B2 * | 7/2007 | Lamb et al. | 715/744 |
| 7,415,672 B1 * | 8/2008 | Fortini et al. | 715/760 |
| 7,653,878 B1 * | 1/2010 | Russell | 715/748 |
| 7,689,929 B2 * | 3/2010 | Ruthfield et al. | 715/805 |
| 7,818,677 B2 * | 10/2010 | Ruthfield et al. | 715/749 |
| 2002/0103836 A1 | 8/2002 | Fein et al. | |
| 2002/0152244 A1 | 10/2002 | Dean et al. | |
| 2003/0169304 A1 | 9/2003 | Pagan | |

FOREIGN PATENT DOCUMENTS

| | | |
|---|---|---|
| JP | 5189431 | 7/1993 |
| JP | 7056902 | 3/1995 |
| JP | 2001042985 | 2/2001 |

OTHER PUBLICATIONS

Berger et al., "Maximizing Geographic Information System Statistics Readability in a Business Graphic Environment", IBM Technical Disclosure Bulletin, vol. 37, No. 4A, Apr. 1994, pp. 39-40.

\* cited by examiner

*Primary Examiner* — William L Bashore
*Assistant Examiner* — David Phantana Angkool
(74) *Attorney, Agent, or Firm* — Yee & Associates, P.C.; Steven L. Bennett (57) ABSTRACT

A computer implemented method, apparatus, and computer program product for a first pull down menu associated with a user interface. In response to receiving a request from the user to toggle the user interface between a user interface containing an original pull down menu and a user interface containing a modified pull down menu, the user interface is presented with the first pull down menu wherein the first pull down menu is the modified pull down menu. A user request associated with a feature presented in the first pull down menu is monitored. Values associated with requests received from a user are stored in a set of usage information. The first pull down menu is modified using the set of usage information to form a second pull down menu. The user interface containing the second pull down menu is presented to the user.

17 Claims, 6 Drawing Sheets

METHOD AND APPARATUS FOR GENERATING ADAPTABLE PULL DOWN MENUS

BACKGROUND OF THE INVENTION

1. Field of the Invention

The present invention relates generally to the data processing field. Still more particularly, the present invention relates to a computer implemented method, apparatus, and computer program product for generating adaptable pull down menus.

2. Description of the Related Art

Data processing systems generally provide a user interface that allows a user to interact with the data processing systems. Most user interfaces are graphical in nature comprising of buttons and menus enabling a user to select a presented function by clicking on the item.

One method for compacting available functions associated with a user interface is to present a list of functions in a pull down menu, which is also known as a drop down menu. The pull down menu typically groups related functions together into a broadly named category, such as "Edit". When a user selects the category, a list of available features relating to the category is presented. In addition, certain features may present a list of submenus providing further features in association with the selected feature.

SUMMARY OF THE INVENTION

The illustrative embodiments described herein provide a computer implemented method, apparatus, and computer program product for modifying a first pull down menu associated with a user interface. The illustrative embodiments monitor for a user request associated with a feature presented in the first pull down menu. A count value associated with the feature is incremented in response to receiving the user request associated with the feature. The count value is stored in a set of usage information. The first pull down menu is modified using the set of usage information to form a second pull down menu in response to a determination to update the first pull down menu. The user interface containing the second pull down menu is presented to the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an exemplary embodiment when read in conjunction with the accompanying drawings, wherein:

DETAILED DESCRIPTION OF THE PREFERRED EMBODIMENT

Figure 1:
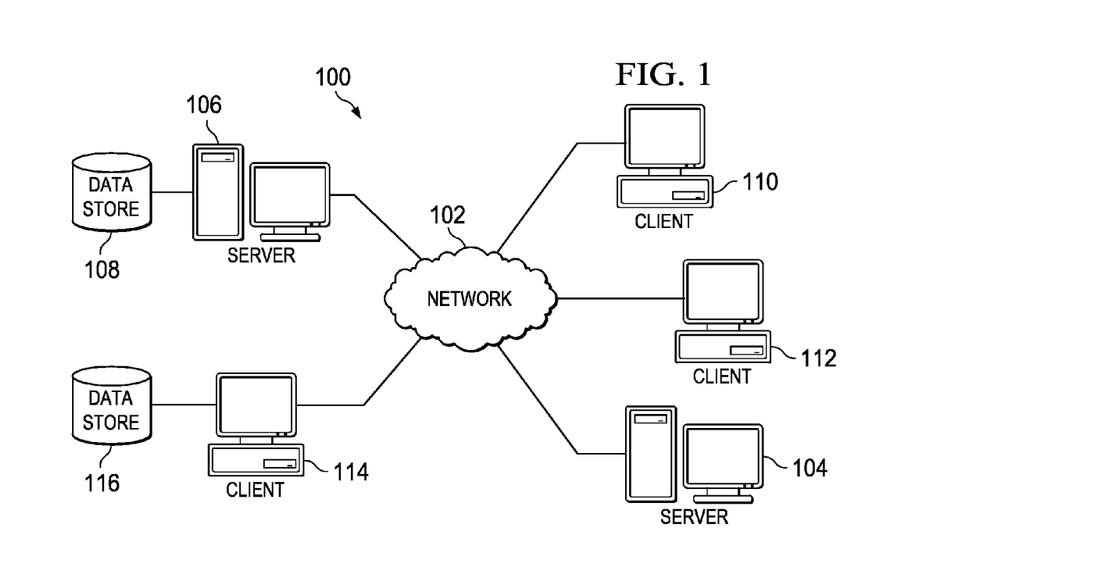
FIG. 1 is a pictorial representation of a network of data processing systems in which exemplary embodiments may be implemented.
Figure 2:
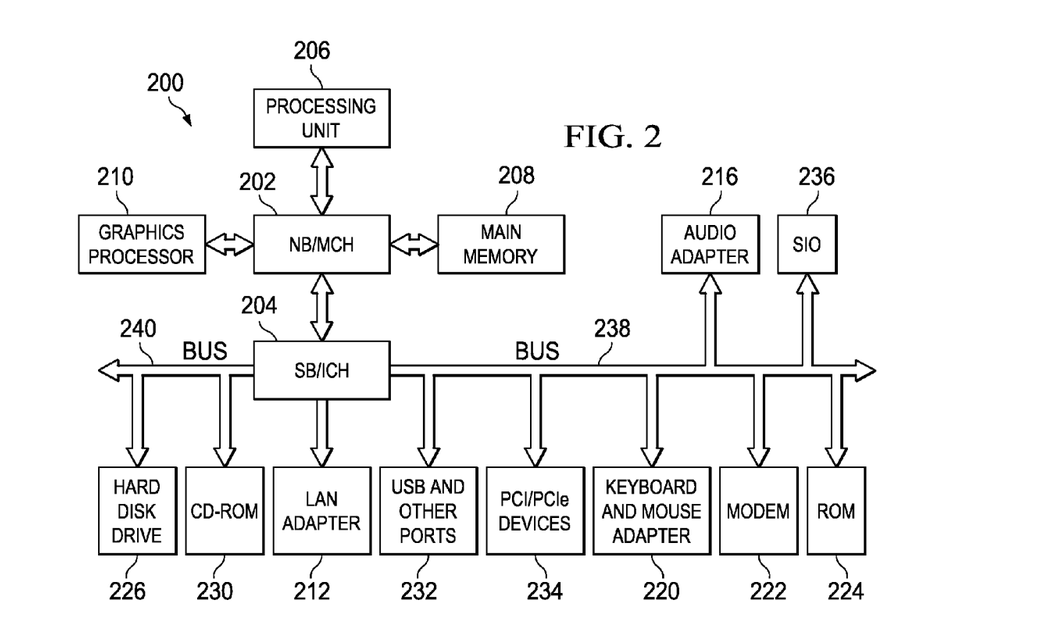
FIG. 2 is a block diagram of a data processing system in which exemplary embodiments may be implemented.

With reference now to the figures and in particular with reference to FIGS. 1-2, exemplary diagrams of data processing environments are provided in which exemplary embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which exemplary embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102. Server 104 and server 106 may include a data store, such as data store 108. In this illustrative example, data store 108 is associated with server 106. In addition, clients 110, 112, and 114 connect to network 102. Clients 110, 112, and 114 may be, for example, personal computers, laptops, cellular phones, personal digital assistants (PDAs), or network computers. Clients 110, 112, and 114 may also include a data store, such as data store 116. In the depicted example, clients 110, 112, and 114 are clients to server 106. For example, server 106 may provide data or services, such as, but not limited to, boot files, operating system images, and applications to clients 110, 112, and 114. Network data processing system 100 may include additional servers, clients, and other devices not shown.

The illustrative embodiments described herein provide a computer implemented method, apparatus, and computer program product for modifying a pull down menu associated with a user interface. The illustrative embodiments may be implemented in any data processing system having a graphical user interface, such as, but not limited to, client 110. For example, client 110 may be a personal computer, cellular device, or a personal digital assistant having a graphical user interface.

The operating system or applications running on client 110 may contain pull down menus comprising of list of options/features associated with the application. A pull down menu is a menu of commands or options that appears in response to selecting an item. The term pull down menu, as referenced herein, may include, but is not limited to, menus that appear beneath, above, or adjacent to the selected item. For example, an internet browser, running on client 110, displays data received from a server, such as server 106, through a network, such as network 102, may have a menu bar near the top of the user interface. Typical items displayed in the menu bar of an internet browser may include "File", "Edit", "View", "History", "Bookmark", "Tools", and "Help". A pull down menu is presented in response to selecting one of the items in the menu bar.

Currently, the implementation of pull down menus including the features that are presented in the list of items and the order that the features appear are fixed by software developers during the software development phase. The illustrative embodiments recognize that different users may use different options more frequent than others. Thus, the fixed implementation of the pull down menus may not be efficient for some users.

Accordingly, the illustrative embodiments described herein provide a computer implemented method, apparatus, and computer program product for modifying a first pull down menu associated with a user interface. The illustrative embodiments monitor for a user request associated with a feature presented in the first pull down menu. A count value associated with the feature is incremented in response to receiving the user request associated with the feature. The count value is stored in a set of usage information. As used in the different examples, a set refers one of more items. For example, a set of usage information is one ore more pieces of usage information, such as one or more values. The first pull down menu is modified using the set of usage information to form a second pull down menu in response to a determination to update the first pull down menu. The user interface containing the second pull down menu is presented to the user.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different exemplary embodiments.

With reference now to FIG. 2, a block diagram of a data processing system is shown in which exemplary embodiments may be implemented. Data processing system 200 is an example of a data processing system, such as server 104 or client 110 in FIG. 1, in which computer usable program code or instructions implementing the processes may be located for the exemplary embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the exemplary embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
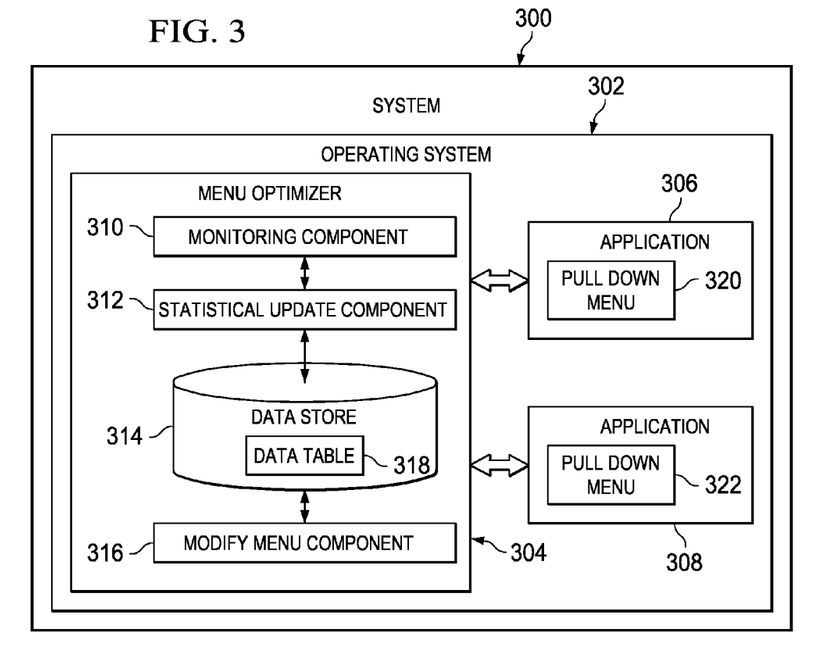
FIG. 3 is a block diagram of a data processing environment in accordance with an illustrative embodiment.

With reference now to FIG. 3, a block diagram of a data processing environment is depicted in which illustrative embodiments may be implemented. System 300 may be implemented in a data processing system, such as a client 110 shown in FIG. 1, or data processing system 200 shown in FIG. 2. System 300 includes, among other components, operating system 302, menu optimizer 304, application 306, and application 308.

Operating system 302 runs within system 300. Operating system 302 may be, but is not limited to, any commercially available operating system, such as, for example, Microsoft® Windows Server® operating system. The illustrative embodiments may be implemented in menu optimizer 304 running on operating system 302. Additionally, operating system 302 may run other software components or applications, such as applications 306 and 308.

In this illustrative embodiment, menu optimizer 304 comprises of a monitoring component 310, a statistical update component 312, a data store 314, and a modify menu component 316. The depicted example is not meant to imply limitations to a specific implementation. For example, menu optimizer 304 may contain other components not illustrated and/or the depicted components may be combined or omitted in certain implementations. In addition, menu optimizer 304 may be implemented as a third party component separate from an application, such as applications 306 and 308, or may be incorporated into an implementation of an application.

Monitoring component 310 monitors applications, such as application 306 and application 308. Application 306 and application 308 may comprise of one or more pull down menus, such as pull down menu 320 and 322. The montoring may be for requests received from selecting an item on a pull menu. Monitoring component 310 may be preconfigured with all the available options of a pull down menu. Alternatively, monitoring component 310 may dynamically determine the available options of a pull down menu. In response to monitoring component 310 receiving a user request associated with a feature of a pull down menu, monitoring component 310 passes an identifier associated with the feature to statistical update component 312. The identifier may be, but is not limited to, the name associated with the feature, a pointer referencing the feature, or a pathname associated with the feature's location within the menus and submenus of the pull-down menu.

In these examples, statistical update component 312 updates a count value in a set of usage information. The set of usage information may be arranged in, but is not limited to, a data table, such as, data table 318. A data table is a data structure in which the organization of information is presented in rows and fields. The data table may represent data associated with a database, such as data store 314. The set of usage information may be stored in other types of data structures, such as, but not limited to, link lists, arrays, and binary trees.

In one illustrative embodiment, the data table contains the names of all possible features presented in a pull down menu. Associated with each feature is a count value. The count value indicates the frequency of usage for each feature. Statistical update component 312 increments the count value associated with a feature every time the feature is selected.

In another illustrative embodiment, in addition to the count value, the data table also contains a sequence value associated with each feature. The sequence value indicates an order of recently used features. Statistical update component 312 updates the sequence value by marking the feature to indicate that the feature was the most recently used feature and decrementing the sequence value associated with the other features within the data table. Statistical update component 312 stores the updated count value and the sequence value in the data table.

Modify menu component 316 is responsible for modifying the pull down menu. Modify menu component 316 may execute continuously in the background or may execute only at a set time. For example, modify menu component 316 may execute after a session finishes. A session may finish under different conditions, such as, for example, but not limited to, when the session ends or when the session is saved.

In one illustrative embodiment, modify menu component 316 modifies the order of the pull down menu items based on the count value associated with each feature to generate a new/second pull down menu. The second pull down menu displays features/items within the main menu in order of descending count values. The main menu, as referenced herein, is the first menu that is presented in response to selecting a pull down menu. Items within the main menu may include submenus presenting additional features.

The features presented in the main menu may be restricted to the items that were previously listed in the main menu of the original pull down menu. In another illustrative embodiment, the features presented in the main menu of the modified pull down menu may contain features that were previously presented as sub features of the original pull down menu. In this illustrative example, the count value associated with each sub feature is compared with all other features of the pull down menu and ranked accordingly.

In another illustrative embodiment, modify menu component 316 modifies the order of the pull down menu items based on a weight value associated with each feature to generate a second pull down menu. In this illustrative example, modify menu component 316 generates a weight value for each feature based on the associated count value and sequence value. The second pull down menu displays items within the main menu in order descending weight values. Again, the features presented in the main menu may be restricted to the items that were previously listed in the main menu of the original pull down menu or may contain features that were previously presented as sub features of the original pull down menu.

The algorithm for generating a weight value may be preconfigured at design time. Alternatively, in another illustrative embodiment, a user may specify the percentage of weight applicable to each the count value and the sequence value in generating a weight value. The weight value may also be stored in the set of usage information.

At an appropriate time, such as, but not limited to, during a session save or when the session finishes, modify menu component 316 updates the pull down menu with the second pull down. A user interface containing the second pull down menu is presented to the user. In this illustrative embodiment, the second pull down menu replaces the first pull down menu.

In another illustrative embodiment, the user may be able to toggle between a user interface containing the original pull down menu and a user interface containing the modified pull down menu. The term toggle, as referenced herein, means allowing the user to switch back and forth between two modes. The means for toggling may include, but is not limited to, the user depressing a key or giving a voice command.

In another illustrative embodiment, the user interface may contain both the original pull down menu and the modified pull down menu. In this illustrative embodiment, the user may choose the convenience of either pull down menu.

Furthermore, in another illustrative embodiment, the modified pull down menu may only contain a portion of the original pull down menu. For example, the modified pull down menu may only contain features that have been previously used by a user. The features may be presented in descending count order or weight order, as applicable.

Figure 4:
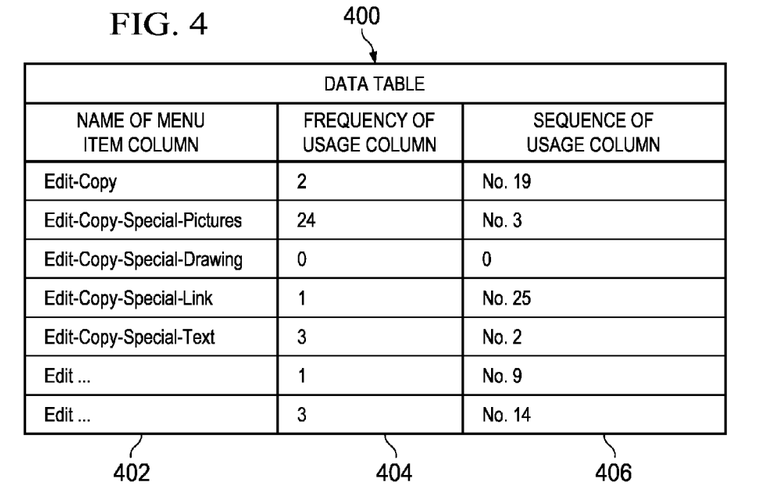
FIG. 4 is a diagram of a data table in accordance with an illustrative embodiment.

With reference now to FIG. 4, a diagram of a data table is depicted in accordance with an illustrative embodiment. In this illustrative embodiment, data table 400 comprises of a name of menu item column 402, a frequency of usage column 404, and a sequence of usage column 406.

Name of menu item column 402 contains a listing of all the names/references to each feature presented in a pull down menu. Not all features are for the different embodiments are depicted in data table 400. Other features not shown in this example may be used in addition to or in place of the depicted features. For example, in this illustrative embodiment, the features associated with the "Edit" pull down menu is presented.

Associated with each feature within name of menu item column 402 is a count value. The count values are depicted under frequency of usage column 404. In response to receiving a user request associated with a feature within name of menu item column 402, the associated count value, under frequency of usage column 404, is incremented. For example, in this illustrative embodiment, a user request for the feature, "Edit-Copy", has been received twice. In addition, in this illustrative embodiment, the feature, "Edit-Copy Special-drawing", has never been used. Thus, the count value associated with this feature remains at zero.

Additionally, in this illustrative embodiment, associated with each feature within name of menu item column 402 is a sequence value. The sequence values are depicted under sequence of usage column 406. The sequence value associated with each feature within name of menu item column 402 indicates the order in which each feature was last used. For example, the sequence value associated with the feature, "Edit-Copy", indicates that this feature is 19th on the list of most recently used features. In other words, 18 other features have been used since the last time the feature, "Edit-Copy", was used.

The significance of the sequence value in generating a weight value, as discussed above, may be preconfigured at design time or may be set according to a user preference. In addition, in another illustrative embodiment, data table 400 may comprise of a column for the generated weight values associated with each feature (not depicted).

Figure 5:
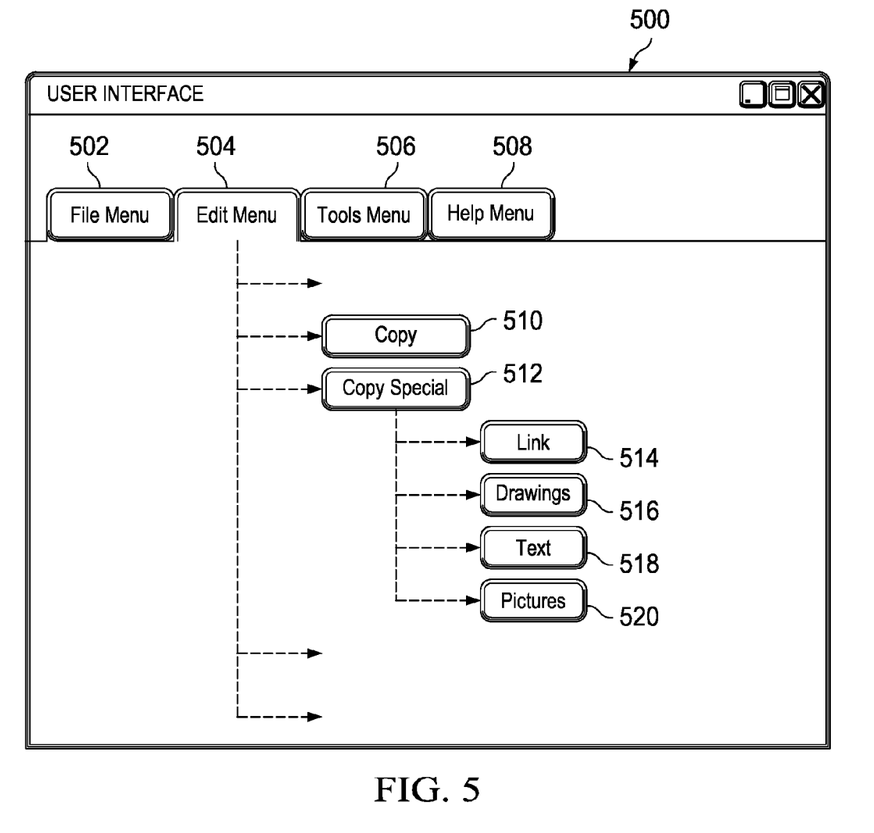
FIG. 5 is a diagram of a user interface containing a pull down menu in accordance with an illustrative embodiment.

With reference now to FIG. 5, a diagram of a user interface containing a pull down menu is depicted in accordance with an illustrative embodiment. User interface 500 may be implemented in a data processing system, such as data processing system 200 shown in FIG. 2. User interface 500 may be a graphical user interface of an application, such as application 306 containing pull down menu 320.

User interface 500 depicts a File menu 502, an Edit menu 504, a Tools menu 506, and a Help menu 508. In this illustrative example, "Copy" 510 and "Copy Special" 512 are features presented in the main menu of Edit menu 504. Additionally, Edit menu 504 comprises of submenus. For example, in this illustrative embodiment, Edit menu 504 contains a submenu under "Copy Special" 512. By selecting "Copy Special" 512 a submenu containing Link 514, Drawings 516, Text 518, and Pictures 520 features are presented. Selection of "Copy Special" 512 may be performed by selecting "Copy Special" 512 using an input device, such as, but not limited to, a mouse or keyboard. In addition, submenu may appear when the mouse cursor hovers over or is in the vicinity of "Copy Special" 512. A data table, in accordance with user interface 500, is depicted in FIG. 4.

Figure 6:
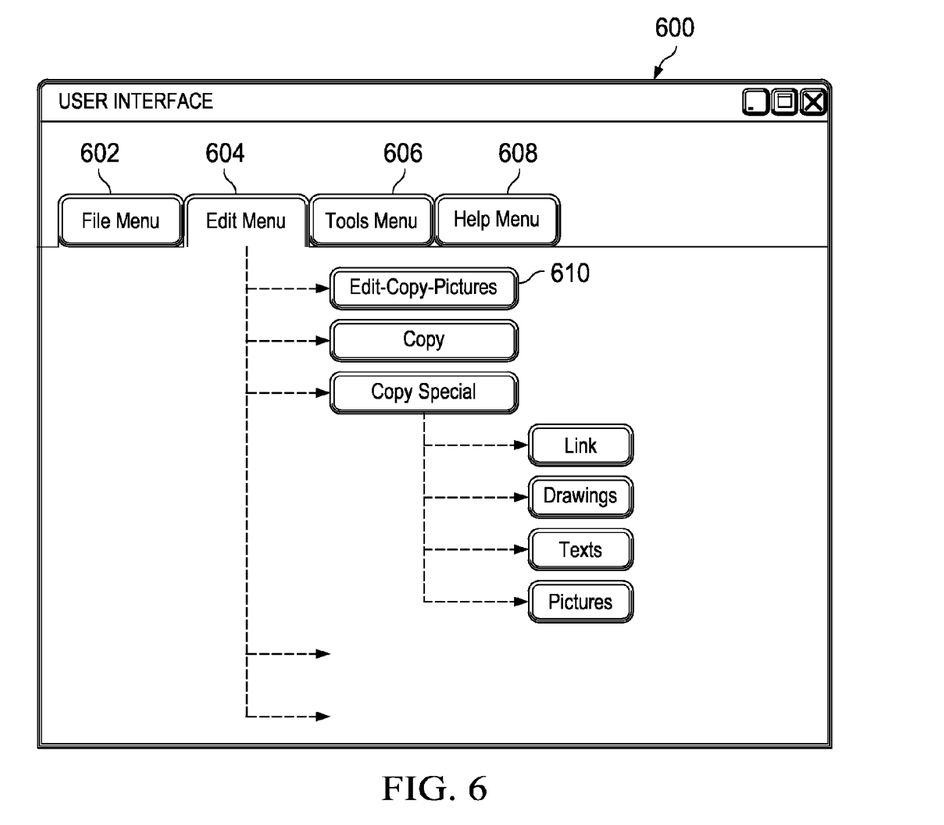
FIG. 6 is a diagram of a user interface containing a modified pull down menu in accordance with an illustrative embodiment.

With reference now to FIG. 6, a diagram of a user interface containing a modified pull down menu is depicted in accordance with an illustrative embodiment. User interface 600 may be implemented in a data processing system, such as data processing system 200 shown in FIG. 2. User interface 600 may be a graphical user interface of an application, such as application 306 containing pull down menu 320.

User interface 600 includes a File menu 602, an Edit menu 604, a Tools menu 606, and a Help menu 608. Edit menu 604 is a modified version of Edit menu 504 as shown in FIG. 5. The features of Edit menu 604 have been ordered based on the values associated with each feature, such as the values depicted in data table 400 shown in FIG. 4.

In this illustrative example, based on the weight value associated with each feature, Edit menu 604 has feature "Edit-Copy-Pictures" 610 as the first feature presented in the main menu of Edit menu 604. The order of the remaining features of Edit menu 604 may also be modified (not depicted) or may remain unchanged. The ordering of the features may be, but is not limited to, placing the items in descending weight values. In addition, the ordering may be based on a user define preference. As a result, Edit menu 604 provides a more efficient pull down menu for a particular user based on post-statistical analysis of usage information.

Figure 7:
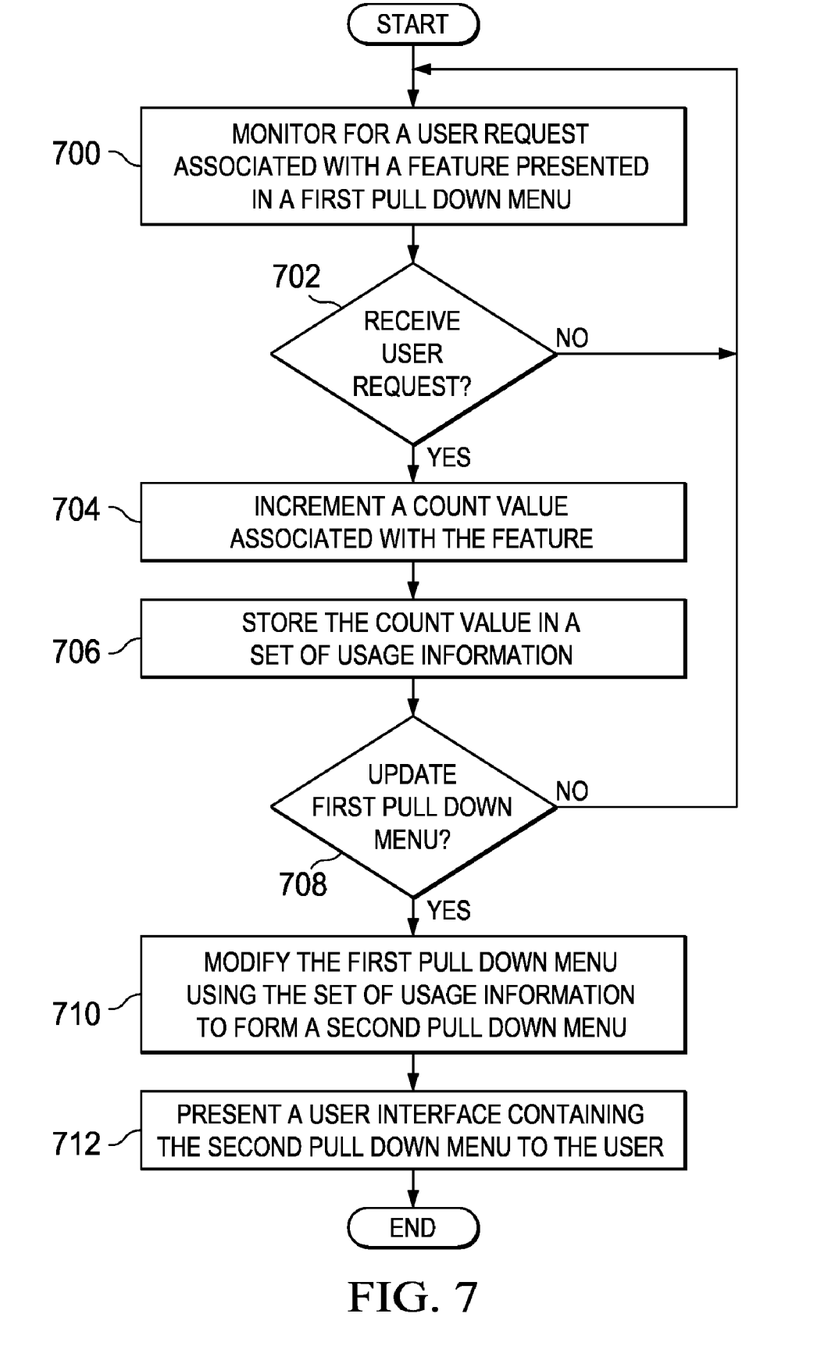
FIG. 7 is a flowchart of a process for modifying a pull down menu in accordance with an illustrative embodiment.

With reference now to FIG. 7, a flowchart of a process for modifying a pull down menu in accordance with an illustrative embodiment. The process of FIG. 7 may be implemented in a software component, such as menu optimizer 304 shown in FIG. 3.

The process begins by monitoring for a user request associated with a feature presented in a first pull down menu (step 700). The process determines whether a request associated with a feature presented in a first pull down menu is received (step 702). In response to receiving the user request associated with the feature, the process increments a count value associated with the feature (step 704). The process stores the count value in a set of usage information (step 706). The process determines whether the first pull down menu is to be updated (step 708).

In response to a determination to update the first pull down menu, the process modifies the first pull down menu using the set of usage information to form a second pull down menu (step 710). The process presents a user interface containing the second pull down menu to the user (step 712), with the process terminating thereafter.

Figure 8:
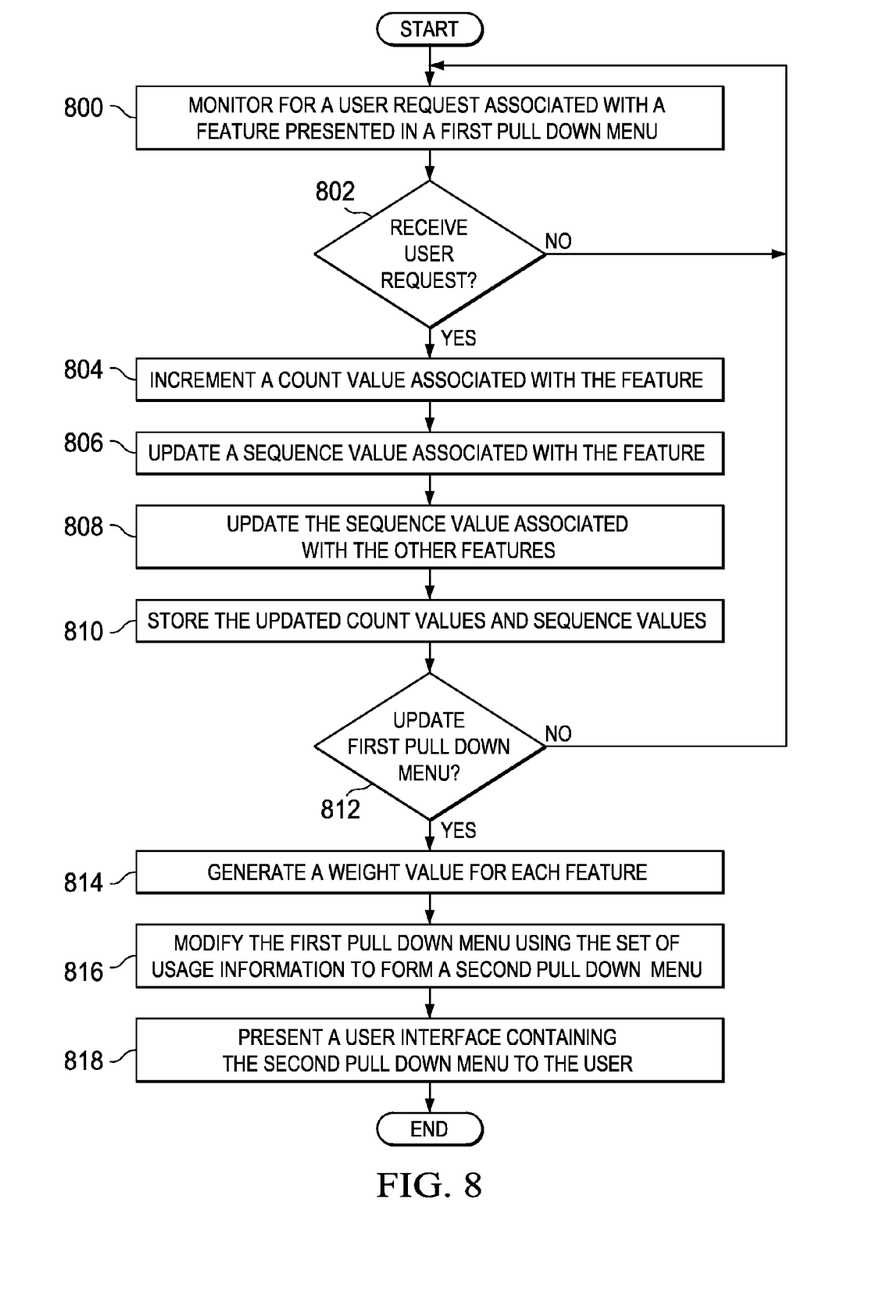
FIG. 8 is a flowchart for modifying a pull down menu in accordance with another illustrative embodiment.

FIG. 8 is a flowchart for modifying a pull down menu in accordance with another illustrative embodiment. The process of FIG. 8 may be implemented in a software component, such as menu optimizer 304 shown in FIG. 3.

The process begins by monitoring for a user request associated with a feature presented in a first pull down menu (step 800). The process determines whether a request associated with a feature presented in a first pull down menu is received (step 802). In response to receiving the user request associated with the feature, the process increments a count value associated with the feature (step 804).

In addition, the process updates a sequence value associated with the feature (step 806). The process also updates the sequence value associated with the other features stored in the set of usage information (step 808). The process stores the updated count values and sequence values associated with the features in a set of usage information (step 810).

The process monitors for an appropriate time to update the pull down menu (step 812). For example, an update request may be performed, but is not limited to, after a session ends or when a session is saved. In addition, the process may perform an update at a preconfigured time or at a time determined by a user preference.

In response to receiving an update request, the process generates a weight value for each feature based on the associated count value and sequence value (step 814). In another illustrative embodiment, the weight value for each feature may be generated prior to receiving an update request. In addition, the process may store the generated weight values in the set of usage information.

The process reorders the features based on the weight values associated with each feature (step 816). For example, the features may be ordered based on descending weight values. The process presents a user interface containing a pull down menu comprising of the reordered features (step 818), with the process terminating thereafter.

Accordingly, the illustrative embodiments described herein provide a computer implemented method, apparatus, and computer program product for modifying a first pull down menu associated with a user interface. The illustrative embodiments monitor for a user request associated with a feature presented in the first pull down menu. A count value associated with the feature is incremented in response to receiving the user request associated with the feature. The count value is stored in a set of usage information. The first pull down menu is modified using the set of usage information to form a second pull down menu in response to a determination to update the first pull down menu. The user interface containing the second pull down menu is presented to the user.

In addition, the illustrative embodiments provide a sequence value that may be used in conjunction with the count value associated with a feature to generate a weight value. In some illustrative embodiments, modification of a pull down menu is based on the weight value associated with each feature.

Accordingly, the illustrative embodiments provide a solution to overcome the problems associated with the current methods of presenting a pull down menu. The illustrative embodiments present a convenient and efficient method for saving time and improving productivity associated with using a user interface.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for modifying a first pull down menu associated with a user interface, the computer implemented method comprising:

presenting the user interface with the first pull down menu in response to receiving a request from the user to toggle the user interface between a user interface containing an original pull down menu and a user interface containing a modified pull down menu, wherein the first pull down menu is the modified pull down menu;

monitoring for a user request associated with a feature presented in the first pull down menu, wherein the feature is a subfeature, wherein the subfeature is a feature presented in a submenu of a second feature associated with the first pull down menu;

responsive to receiving the user request associated with the feature, incrementing a count value associated with the feature, wherein the count value is recorded in a counter to track a number of times that the feature is selected;

storing the count value in a set of usage information;

responsive to a determination to update the first pull down menu, modifying the first pull down menu using the set of usage information to form a second pull down menu, wherein the second pull down menu displays the feature in a different order among a set of features from the first pull down menu based on the set of usage information; and presenting the user interface containing the second pull down menu to the user.

2. The computer implemented method of claim 1, further comprising:

responsive to receiving the user request associated with the feature, updating a sequence value associated with the feature, wherein the sequence value indicates an order of recently used features;

storing the sequence value in the set of usage information;

generating a weight value using the sequence value and the count value associated with the feature; wherein modifying the first pull down menu using the set of usage information to form a second pull down menu utilizes the weight value.

3. The computer implemented method of claim 2, wherein the second pull down menu displays the set of features within a main menu in order of descending weight values, wherein the main menu is a first menu that presented in response to selecting the second pull down menu.

4. The computer implemented method of claim 2, wherein the set of usage information comprises of a feature identifier, a count value, and a sequence value for every feature associated with the first pull down menu.

5. The computer implemented method of claim 4, wherein the set of usage information comprises of a weight value for every feature associated with the first pull down menu, wherein the weight is generated using the sequence value and the count value associated with the feature.

6. The computer implemented method of claim 1, wherein the second pull down menu displays the set of features within a main menu in order of descending count values, wherein the main menu is a first menu that presented in response to selecting the second pull down menu.

7. The computer implemented method of claim 1, wherein the second pull down menu displays the subfeature within a main menu, wherein the main menu is a first menu that is presented in response to selecting the pull down menu.

8. The computer implemented method of claim 1, wherein the second pull down menu comprises only of a portion of the first pull down menu.

9. The computer implemented method of claim 1, wherein the user interface presented to the user comprises of both the first pull down menu and the second pull down menu.

10. A computer program product comprising:
a computer usable medium including computer usable program code for modifying a first pull down menu associated with a user interface, said computer program product comprising:
computer usable program code for presenting the user interface with the first pull down menu in response to receiving a request from the user to toggle the user interface between a user interface containing an original pull down menu and a user interface containing a modified pull down menu, wherein the first pull down menu is the modified pull down menu;
computer usable program code for monitoring for a user request associated with a feature presented in the first pull down menu, wherein the feature is a subfeature, wherein the subfeature is a feature presented in a submenu of a second feature associated with the first pull down menu;
computer usable program code for incrementing a count value associated with the feature in response to receiving the user request associated with the feature, wherein the count value is recorded in a counter to track a number of times that the feature is selected;
computer usable program code for storing the count value in a set of usage information;
computer usable program code for modifying the first pull down menu using the set of usage information to form a second pull down menu in response to a determination to update the first pull down menu, wherein the second pull down menu displays the feature in a different order among a set of features from the first pull down menu based on the set of usage information; and
computer usable program code for presenting the user interface containing the second pull down menu to the user.

11. The computer program product of claim 10, further comprising:
computer usable program code for updating a sequence value associated with the feature in response to receiving the user request associated with the feature, wherein the sequence value indicates an order of recently used features;
computer usable program code for storing the sequence value in the set of usage information;
computer usable program code for generating a weight value using the sequence value and the count value associated with the feature; wherein modifying the first pull down menu using the set of usage information to form a second pull down menu utilizes the weight value.

12. The computer program product of claim 11, wherein the second pull down menu displays the set of features within a main menu in order of descending weight values, wherein the main menu is a first menu that presented in response to selecting the second pull down menu.

13. The computer program product of claim 11, wherein the set of usage information comprises of a feature identifier, a count value, and a sequence value for every feature associated with the first pull down menu.

14. The computer program product of claim 13, wherein the set of usage information comprises of a weight value for every feature associated with the first pull down menu, wherein the weight is generated using the sequence value and the count value associated with the feature.

15. The computer program product of claim 10, wherein the second pull down menu comprises only of a portion of the first pull down menu.

16. The computer program product of claim 10, wherein the user interface presented to the user comprises of both the first pull down menu and the second pull down menu.

17. An apparatus comprising:
a bus system;
a communications system connected to the bus system;
a memory connected to the bus system, wherein the memory includes computer usable program code; and
a process unit connected to the bus system, wherein the process unit executes the computer usable program code to present the user interface with the first pull down menu in response to receiving a request from the user to toggle the user interface between a user interface containing an original pull down menu and a user interface containing a modified pull down menu, wherein the first pull down menu is the modified pull down menu; monitor for a user request associated with a feature presented in the first pull down menu, wherein the feature is a subfeature, wherein the subfeature is a feature presented in a submenu of a second feature associated with the first pull down menu; increment a count value associated with the feature in response to receiving the user request associated with the feature, wherein the count value is recorded in a counter to track a number of times that the feature is selected; store the count value in a set of usage information; modify the first pull down menu using the set of usage information to form a second pull down menu in response to a determination to update the first pull down menu, wherein the second pull down menu displays the feature in a different order among a set of features from the first pull down menu based on the set of usage information; and present the user interface containing the second pull down menu to the user.

* * * * *